United States Patent
Miyamoto

(10) Patent No.: US 11,842,066 B2
(45) Date of Patent: Dec. 12, 2023

(54) CONTROL APPARATUS AND INFORMATION PROCESSING SYSTEM FOR PROVIDING A BRIDGE APPARATUS BETWEEN A HOST CONTROLLER AND A NON-VOLATILE STORAGE MEDIUM TO ENCRYPT AND DECRYPT DATA

(71) Applicant: CANON KABUSHIKI KAISHA, Tokyo (JP)

(72) Inventor: Takayuki Miyamoto, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 17/510,109

(22) Filed: Oct. 25, 2021

(65) Prior Publication Data

US 2022/0129188 A1    Apr. 28, 2022

(30) Foreign Application Priority Data

Oct. 28, 2020  (JP) ................................ 2020-180571

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC .... G06F 3/0604; G06F 3/0655; G06F 3/0679; G06F 3/061; G06F 3/0659; G06F 3/067
See application file for complete search history.

(56) References Cited

U.S. PATENT DOCUMENTS

| | | | | |
|---|---|---|---|---|
| 2020/0278794 | A1* | 9/2020 | Ross | G06F 3/0607 |
| 2020/0341870 | A1* | 10/2020 | Frolikov | G06F 3/0619 |
| 2022/0107758 | A1* | 4/2022 | Benisty | G06F 3/0679 |

FOREIGN PATENT DOCUMENTS

JP    2012168960 A    9/2012

* cited by examiner

*Primary Examiner* — Jane W Benner
(74) *Attorney, Agent, or Firm* — Canon U.S.A., Inc. IP Division

(57) ABSTRACT

A control apparatus includes a first accepting unit accepting multiple requests from a host controller, a first transmission unit transmitting the multiple host controller requests to a storage upon acceptance, from the storage, of a transmission request for the multiple requests, a second accepting unit accepting the multiple host controller requests and accepting a response to each host controller request from the storage, a first storing unit storing the multiple host controller requests and storing the accepted response to each host controller request, the accepting performed by the second accepting unit, and a control unit causing, upon acceptance of an error as the response to a first host controller request, among the multiple host controller requests, the first storing unit to store the same request as the first host controller request.

11 Claims, 8 Drawing Sheets

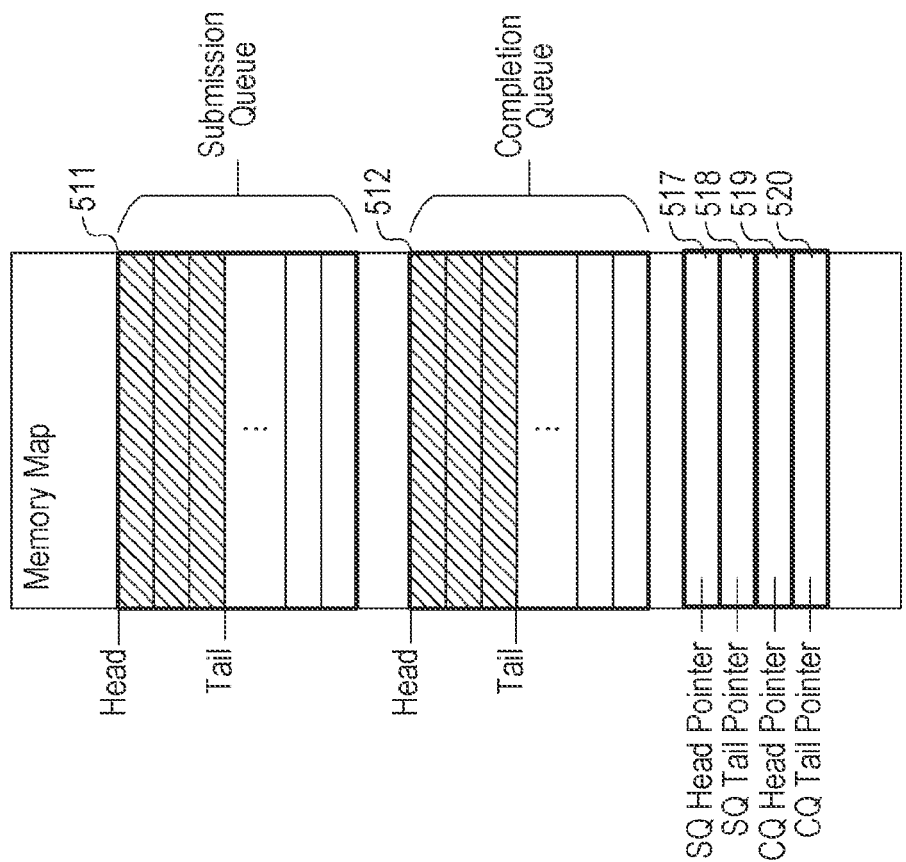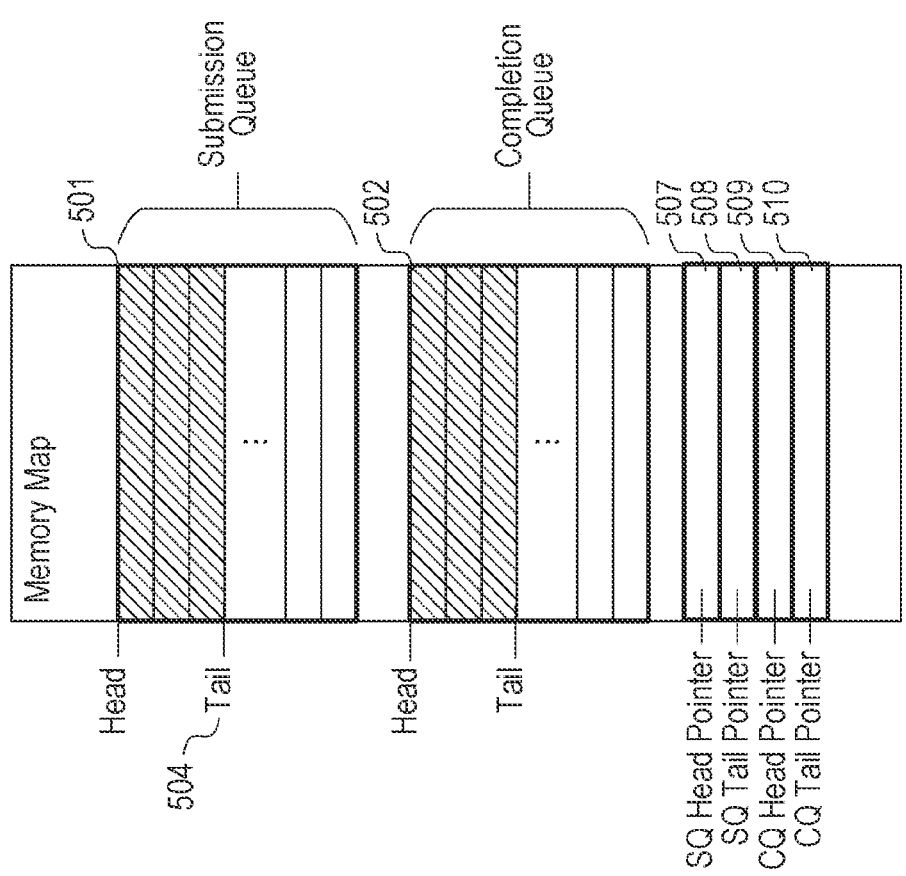

CONTROL APPARATUS AND INFORMATION PROCESSING SYSTEM FOR PROVIDING A BRIDGE APPARATUS BETWEEN A HOST CONTROLLER AND A NON-VOLATILE STORAGE MEDIUM TO ENCRYPT AND DECRYPT DATA

BACKGROUND

Field

The present disclosure relates to a control apparatus and a method of controlling the control apparatus.

Description of the Related Art

In information processing apparatuses, such as personal computers (PCs), hard disk drives (HDDs) have been replaced in recent years with solid state drives (SSDs), which are non-volatile semiconductor memory devices, to enable higher data transfer. In contrast, since serial AT attachment (SATA), which is an interface used in these memory devices, has high physical overhead required for data encoding in transfer and has high latency, the SSDs do not deliver their original transfer performance when used with SATA. Accordingly, SSDs supporting Non-volatile Memory Express (NVMe) protocol, which is a new protocol that can allow for direct connections to a general-purpose PCI-Express (PCIe) bus and that utilizes the high-speed performance of the SSDs, have started to appear in recent years.

In addition, in order to prevent leakage of data through analysis of a storage medium, such as the HDD or the SSD, a technology to provide a bridge apparatus between a host and the storage medium to encrypt and decrypt data has been developed.

For example, Japanese Patent Laid-Open No. 2012-168960 discloses a method of providing a bridge apparatus between an HDD and a host controller for encryption and decryption.

An error may occur due to noise or the like that occurs on a transmission path in a transmission apparatus in the data transfer between the HDD and the host controller. If such an error occurs, the host controller generally performs an error retransmission process. However, in the case of a configuration including the bridge apparatus, the time required for the error retransmission process may be lengthened because the path from the host controller to the memory device is lengthened and processes performed in the bridge apparatus are added.

SUMMARY

Various embodiments of the present disclosure provide a control apparatus that minimizes the time required for error processing.

According to one embodiment of the present disclosure, a control apparatus communicates with a non-volatile storage and a host controller. The control apparatus includes a first accepting unit that accepts multiple requests from the host controller; a first transmission unit that transmits the multiple host controller requests to the non-volatile storage upon acceptance of a transmission request for the multiple host controller requests from the non-volatile storage; a second accepting unit that accepts the multiple host controller requests and that accepts a response to each host controller request from the non-volatile storage; a first storing unit that stores the multiple host controller requests and that stores the accepted response to each host controller request, the accepting performed by the second accepting unit; and a control unit that causes, upon acceptance of an error as the response to a first host controller request, among the multiple host controller requests, the first storing unit to store the same request as the first host controller request.

Further features of the present disclosure will become apparent from the following description of example embodiments with reference to the attached drawings.

BRIEF DESCRIPTION OF THE DRAWINGS

FIG. 5A and FIG. 5B are detailed diagrams of memories in the HC and the bridge apparatus in the first embodiment.

DESCRIPTION OF THE EMBODIMENTS

Various embodiments of the present disclosure will be described herein in detail with reference to the drawings. The example embodiments described below should not be read as limiting the scope of the present invention, and all combinations of features described in the respective embodiments are not necessarily essential to all embodiments of the present disclosure. For example, in various example embodiments described herein, an image processing apparatus is used as an example of an information processing apparatus, but in other embodiments, another apparatus may be used as the information processing apparatus.

First Embodiment

Figure 1:
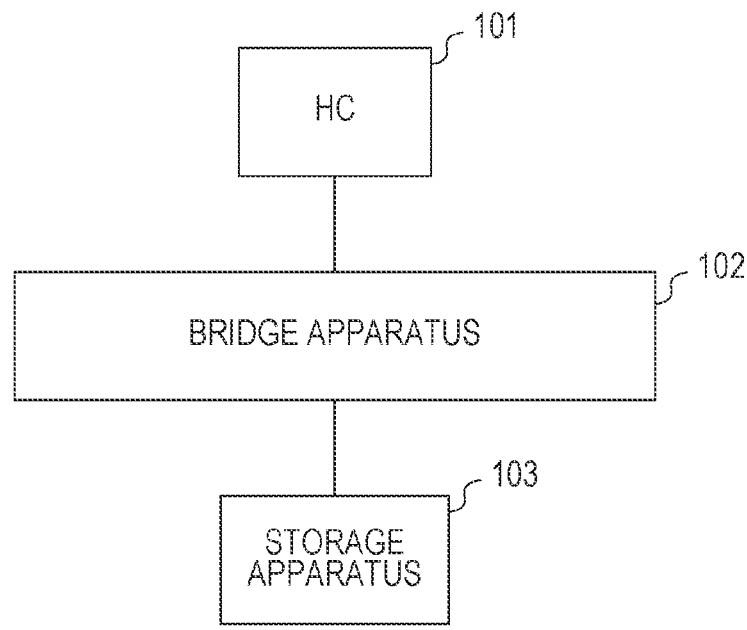
FIG. 1 is a block diagram illustrating the configuration of an information processing system in a first embodiment.

FIG. 1 is a block diagram illustrating the configuration of a system using a bridge apparatus (control apparatus) according to a first embodiment.

The system includes a host controller (hereinafter referred to as HC) 101, a bridge apparatus 102, and a storage apparatus 103.

The HC 101 is connected to the bridge apparatus 102 and functions as a main controller that controls the entire system.

In the first embodiment, the HC 101 is capable of controlling image formation functions, such as a printing function and a scanning function.

The bridge apparatus 102 is connected to the HC 101 and the storage apparatus 103 and encrypts or decrypts data in transfer of the data from the HC 101 to the storage apparatus 103. In addition, the bridge apparatus 102 performs a retransmission process, instead of the HC 101, if an error occurs in the data transfer. Since the operation to encrypt and decrypt data is similar to the one disclosed in Japanese Patent Laid-Open No. 2012-168960, a description of the operation is omitted herein. Furthermore, for example, the bridge apparatus 102 encrypts or decrypts image data read out from a scanner 207 described below and image data and so on accepted from an information processing apparatus (not illustrated) via a network.

The storage apparatus 103 is connected to the bridge apparatus 102. The storage apparatus 103 is an SSD and stores system software, user data, application data, and so on, which are processed by the HC 101. In addition, the storage apparatus 103 stores the image data, which is encrypted by the bridge apparatus 102 after being read out from the scanner 207 described below, and the image data and so on, which is encrypted by the bridge apparatus 102 after being accepted from the information processing apparatus (not illustrated) via the network.

Figure 2:
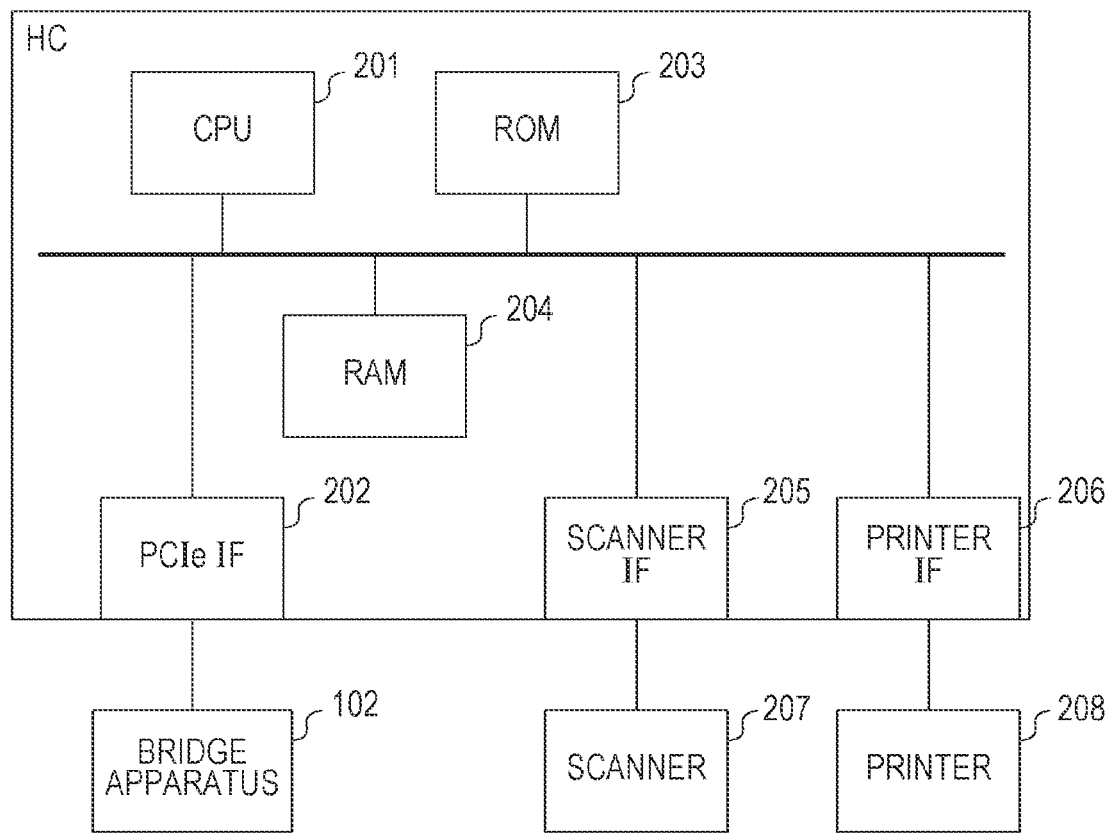
FIG. 2 is a detailed block diagram of a host controller (HC) in the information processing system in the first embodiment.

FIG. 2 is a detailed block diagram of the HC 101.

Referring to FIG. 2, the HC 101 includes a central processing unit (CPU) 201, a PCIe interface (IF) 202, a read only memory (ROM) 203, and a random access memory (RAM) 204. The HC 101 is connected to the bridge apparatus 102 via the PCIe IF 202.

The CPU 201 controls access to various devices connected to the HC 101 based on a control program and so on, which are stored in the ROM 203, and controls a variety of processing performed in the HC 101.

The PCIe IF 202 is an interface conforming to PCI-Express standards and exchanges data with the bridge apparatus 102 using the bridge apparatus 102 as Endpoint.

The ROM 203 is a non-volatile memory. A boot program, the control program, and so on for the bridge apparatus 102 are stored in the ROM 203.

The RAM 204 is a memory, such as a dynamic RAM (DRAM). Data is temporarily stored in the RAM 204. The RAM 204 operates as a working memory. FIG. 5A illustrates an example of a memory map of the RAM 204.

Submission Queue (hereinafter referred to as SQ) 501 and Completion Queue (hereinafter referred to as CQ) 502 are composed in a memory space of the RAM 204. The SQ and the CQ are used in Non-Volatile Memory Express (NVMe) protocol.

A scanner interface (IF) 205 is an interface for communication with the scanner 207. A printer interface (IF) 206 is an interface for communication with a printer 208. The scanner 207 optically reads an image from an original document to generate image data. The printer 208 forms an image on a recording medium (a sheet) using an electrophotographic method.

The SQ 501 is a queue of a ring buffer, which is generated on the RAM 204. NVMe commands generated by the CPU 201 are sequentially stored in the SQ 501 for exchange of the NVMe commands. Head components of the queue are managed with Head pointers 507 and 509 and trail components of the queue are managed with Tail pointers 508 and 510.

In the SQ 501 and the CQ 502, which are updated each time the command is stored in the SQ 501 and the CQ 502, the command is stored in the queue sandwiched between the Head pointer 507 (509) and the Tail pointer 508 (510). When the Head pointer is at the same position as that of the Tail pointer, the queue is empty.

For example, in the example in FIG. 5A, the command or a command processing completion notification is stored in shaded portions. The memory spaces to be allocated to the SQ 501 and the CQ 502 are statically determined. At startup of the system, the CPU 201 ensures the memory spaces of the SQ 501 and the CQ 502 and shares information about the memory spaces of the SQ 501 and the CQ 502 with the bridge apparatus 102 using an administration command. However, the allocation of the memory spaces of the SQ 501 and the CQ 502 is not limited to this.

Figure 3:
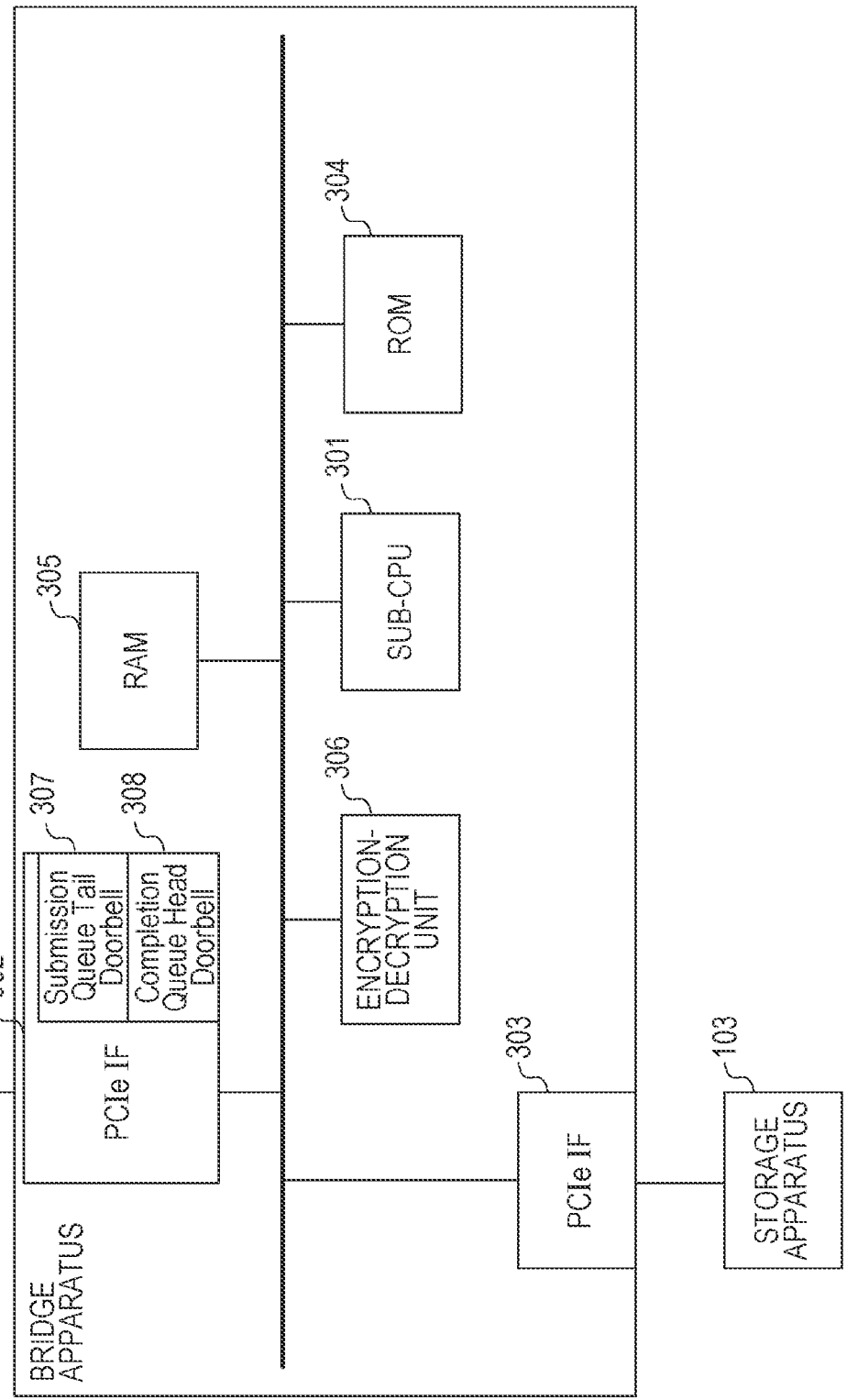
FIG. 3 is a detailed block diagram of a bridge apparatus in the information processing system in the first embodiment.

FIG. 3 is a detailed block diagram of the bridge apparatus 102.

Referring to FIG. 3, the bridge apparatus 102 includes a sub-CPU 301, PCIe IFs 302 and 303, a ROM 304, a RAM 305, and an encryption-decryption unit 306. The bridge apparatus 102 is connected to the HC 101 via the PCIe IF 302 and is connected to the storage apparatus 103 via the PCIe IF 303.

The sub-CPU 301 controls access to the HC 101 and the storage apparatus 103, which are connected to the bridge apparatus 102, based on a control program and so on, which are stored in the ROM 304, and generates a command group for the storage apparatus 103 based on a command group received from the HC 101.

The PCIe IF 302 exchanges data with the HC 101 using the HC 101 as RootComplex. The PCIe IF 302 includes Submission Queue Tail Doorbell (hereinafter referred to as SQTD) 307 and Completion Queue Head Doorbell (hereinafter referred to as CQHD) 308. The SQTD 307 and the CQHD 308 are registers in the PCIe IF 302. The SQTD 307 and the CQHD 308 are used by the HC 101 side to notify the bridge apparatus 102 of information about the SQ Tail pointer 508 and the CQ Head pointer 509 of the HC 101.

The PCIe IF 303 exchanges data with the storage apparatus 103 using the storage apparatus 103 as Endpoint. The ROM 304 is a non-volatile memory. The boot program, the control program, and so on for the bridge apparatus 102 are stored in the ROM 304. The RAM 305 is a memory, such as a DRAM. Data is temporarily stored in the RAM 305. The RAM 305 operates as a working memory. An example of the memory map of the RAM 305 is the same as that of the RAM 204 in the HC 101 (refer to FIG. 5B).

The encryption-decryption unit 306 is a circuit that encrypts data received from the PCIe IF 302 and that decrypts data received from the PCIe IF 303.

Figure 4:
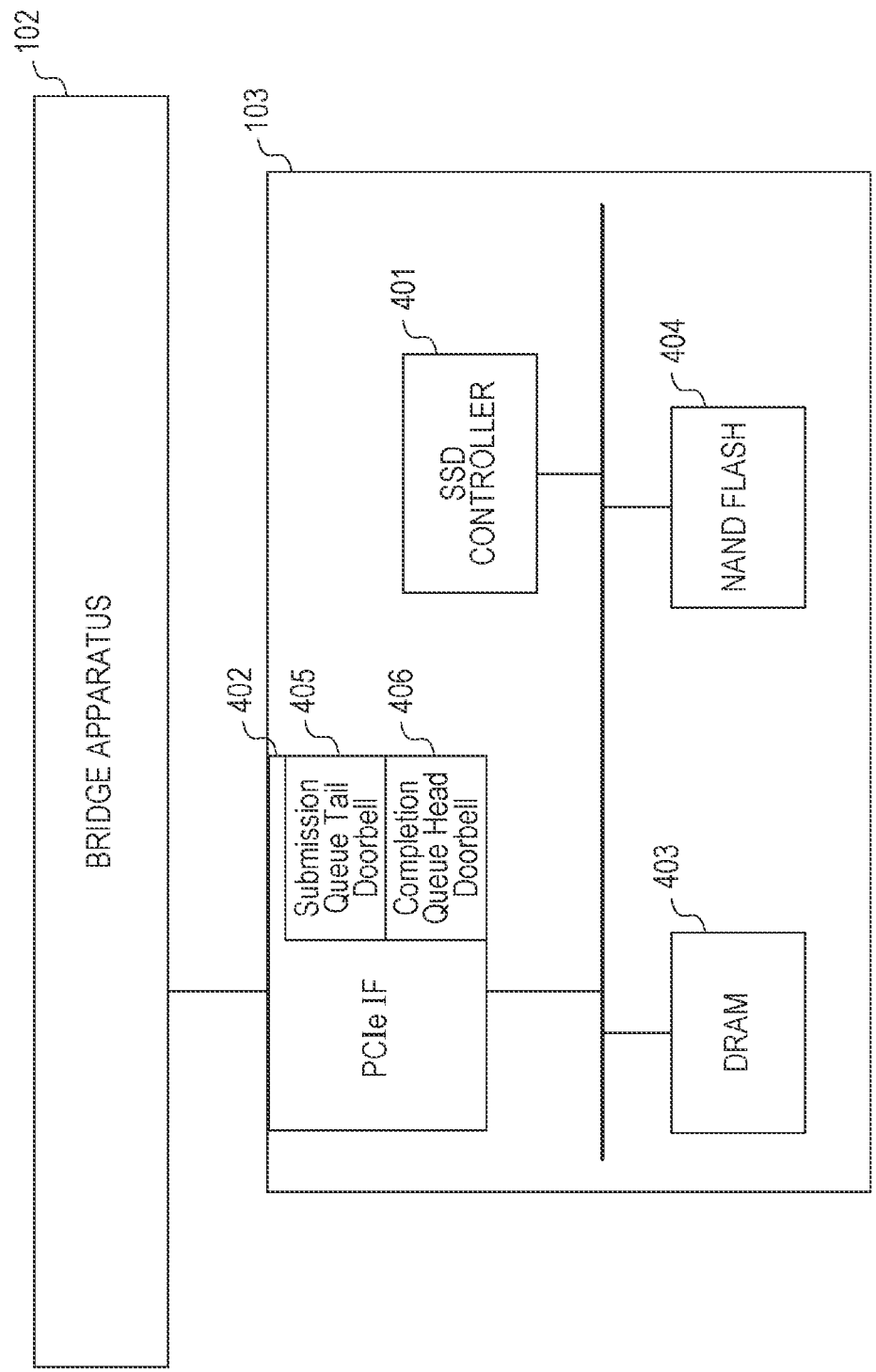
FIG. 4 is a detailed block diagram of a storage apparatus in the information processing system in the first embodiment.

FIG. 4 is a detailed block diagram of the storage apparatus 103.

Referring to FIG. 4, the storage apparatus 103 includes an SSD controller 401, a PCIe IF 402, a DRAM 403, and a NAND FLASH (registered trademark) 404. The storage apparatus 103 is connected to the bridge apparatus 102 via the PCIe IF 402.

A processor that processes firmware executed in the storage apparatus 103, a DRAM controller controlling the DRAM 403, and a NAND FLASH controller controlling the NAND FLASH 404 are installed in the SSD controller 401.

The PCIe IF 402 exchanges data with the bridge apparatus 102 using the bridge apparatus 102 as RootComplex. The PCIe IF 402 includes SQTD 405 and CQHD 406, as in the PCIe IF 302 at the bridge apparatus side.

The SQTD 405 and the CQHD 406 are registers in the PCIe IF 402. The SQTD 405 and the CQHD 406 are registers used to indicate information about an SQ Tail pointer 518 and a CQ Head pointer 519.

The DRAM 403 is a cache memory. Data is temporarily stored in the DRAM 403 before the data is written to the NAND FLASH 404.

The NAND FLASH 404 is a device in which data is recorded. Reading and writing of data from and to the NAND FLASH 404 is performed.

Detailed Operation of HC 101 in First Embodiment

A detailed operation of the HC 101 in the first embodiment will now be described with reference to FIG. 2 and FIG. 5A.

The CPU 201 in the HC 101 creates the NVMe command for input-output (IO) access to the storage apparatus 103 using the NVMe protocol. The CPU 201 in the HC 101 sequentially stores the created NVMe commands in the SQ 501 on the RAM 204. The command stored in the SQ is a request and the command stored in the CQ is a response.

The Tail pointer 508 of the SQ 501 is updated each time the NVMe command is stored and a tail position 504 of the NVMe command stored in the SQ 501 is updated. After the Tail pointer 508 is updated, the value of the Tail pointer 508 of the SQ 501 is written to the SQTD 307 in the bridge apparatus 102. The HC 101 notifies the bridge apparatus 102 that the NVMe command is newly stored (hereinafter referred to as Doorbell notification). Upon reception of this notification, the sub-CPU 301 in the bridge apparatus 102 starts an operation to execute the NVMe command stored in the SQ 501. The operation of the bridge apparatus 102 will be described below.

Upon reception of an interruption indicating that the bridge apparatus 102 has completed the execution of all the commands, the CPU 201 in the HC 101 refers to a command execution result stored in the CQ 502 in the HC 101 to confirm whether the command is correctly executed. The control of writing to and reading from the storage apparatus 103 is performed according to the flow described above.

Detailed Operation of Bridge Apparatus 102 in First Embodiment

A detailed operation of the bridge apparatus 102, which is a feature of the first embodiment, will now be described. An operation of the storage apparatus 103 will also be described here for convenience of description. First, a format 700 of the NVMe command will be described.

Figure 7:
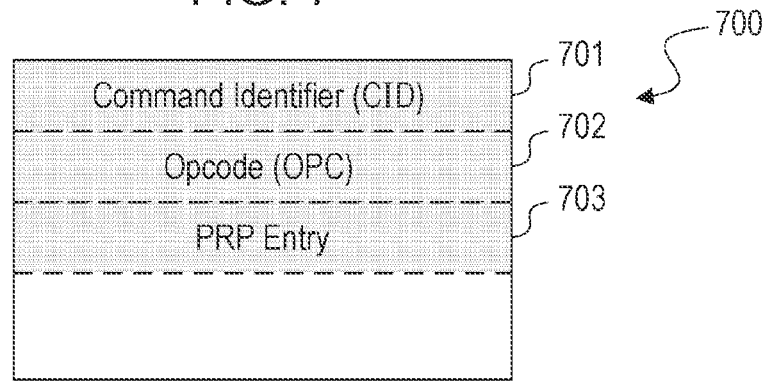
FIG. 7 is a diagram illustrating a format of a command in the first embodiment.

The format 700 of the NVMe command illustrated in FIG. 7 includes fields of Command Identifier (hereinafter referred to as CID) 701, Opcode (hereinafter referred to as OPC) 702, and Physical region page (PRP) Entry 703.

The CID 701 is a unique number added to the command. The OPC 702 is an identifier, such as Write or Read, indicating the kind of the command. Information indicating a source address or a destination address is stored in the PRP Entry 703.

A process of storing the NVMe command in SQ 511 in the bridge apparatus 102 will now be described with reference to a flowchart in FIG. 6. The process in the flowchart in FIG. 6 is performed by the sub-CPU 301 in the bridge apparatus 102.

Figure 6:
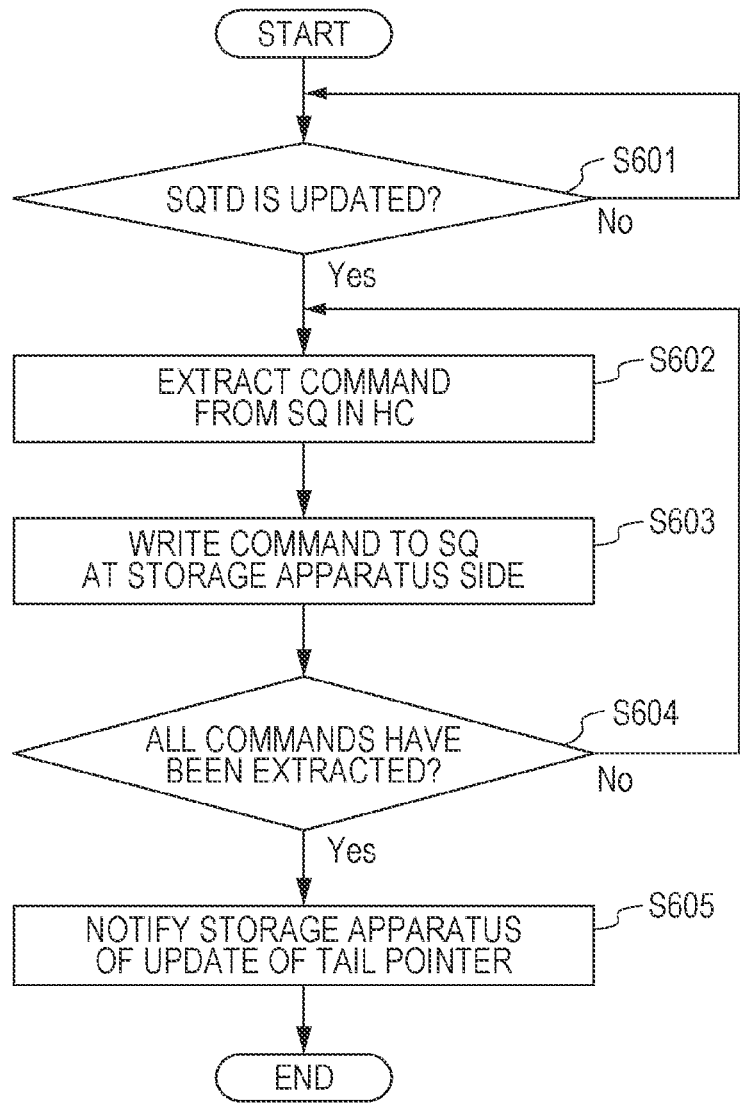
FIG. 6 is a flowchart illustrating a process of extracting a command group from the HC, which is performed by the bridge apparatus, in the first embodiment.

Referring to FIG. 6, in Step S601, the sub-CPU 301 accepts the interruption from the PCIe IF 302, which occurs in the Doorbell notification. The sub-CPU 301 determines whether the value of the SQTD 307 is updated in order to confirm whether the new NVMe command is stored in the SQ 501 in the HC 101. If the value of the SQTD 307 is updated (YES in Step S601), the process goes to Step S602. If the value of the SQTD 307 is not updated (NO in Step S601), the process remains at Step S601.

In Step S602, the sub-CPU 301 reads the NVMe command prepared on the HC 101 from the SQ 501 (transmits a transmission request) to extract the command. The sub-CPU 301 reads out the command from the memory space indicated by the Head pointer of the SQ 501. The initial value of the Head pointer of the SQ 501 is notified of from the HC 101 at startup of the system, as described above, and is managed by a mechanism in which the Head pointer is updated to the value of the Tail pointer upon completion of the transfer of a series of the NVMe commands.

In Step S603, the sub-CPU 301 writes the extracted Write command to the SQ 511, which is the queue for the storage apparatus 103. This is a process of copying the memory. The sub-CPU 301 writes the command in the memory space indicated by the Tail pointer of the SQ 511. The initial value of the Tail pointer of the SQ 511 is set to the value of the Head pointer of the SQ 511. Writing one command increments the values of the Tail pointers of the SQ 511 and CQ 512 by one. The Tail pointer of the CQ 512 is incremented to ensure in advance an area in which the command execution result is stored.

In Step S604, the sub-CPU 301 determines whether the bridge apparatus 102 has extracted all the NVMe commands prepared in the SQ 501 on the HC 101. The sub-CPU 301 confirms the value of the pointer of the SQ 501, which has been referred to in the extraction of the command, and the value of the SQTD 307 and, if the value of the pointer of the SQ 501 is equal to the value of the SQTD 307, determines that the final command stored in the SQ 501 has been extracted.

If all the commands have been extracted (YES in Step S604), the process goes to Step S605. If any command remains in the SQ 501 (NO in Step S604), the process goes back to Step S602 to extract the command again. In Step S605, the sub-CPU 301 notifies the storage apparatus 103 of the update of the Tail pointer.

A process of storing the NVMe command in the SQ 511 in the bridge apparatus 102, notifying the storage apparatus 103 of the storage of the NVMe command, and notifying the HC 101 via the bridge apparatus 102 of the command processing completion notification from the storage apparatus 103 will now be described with reference to a flowchart illustrated in FIG. 8.

Figure 8:
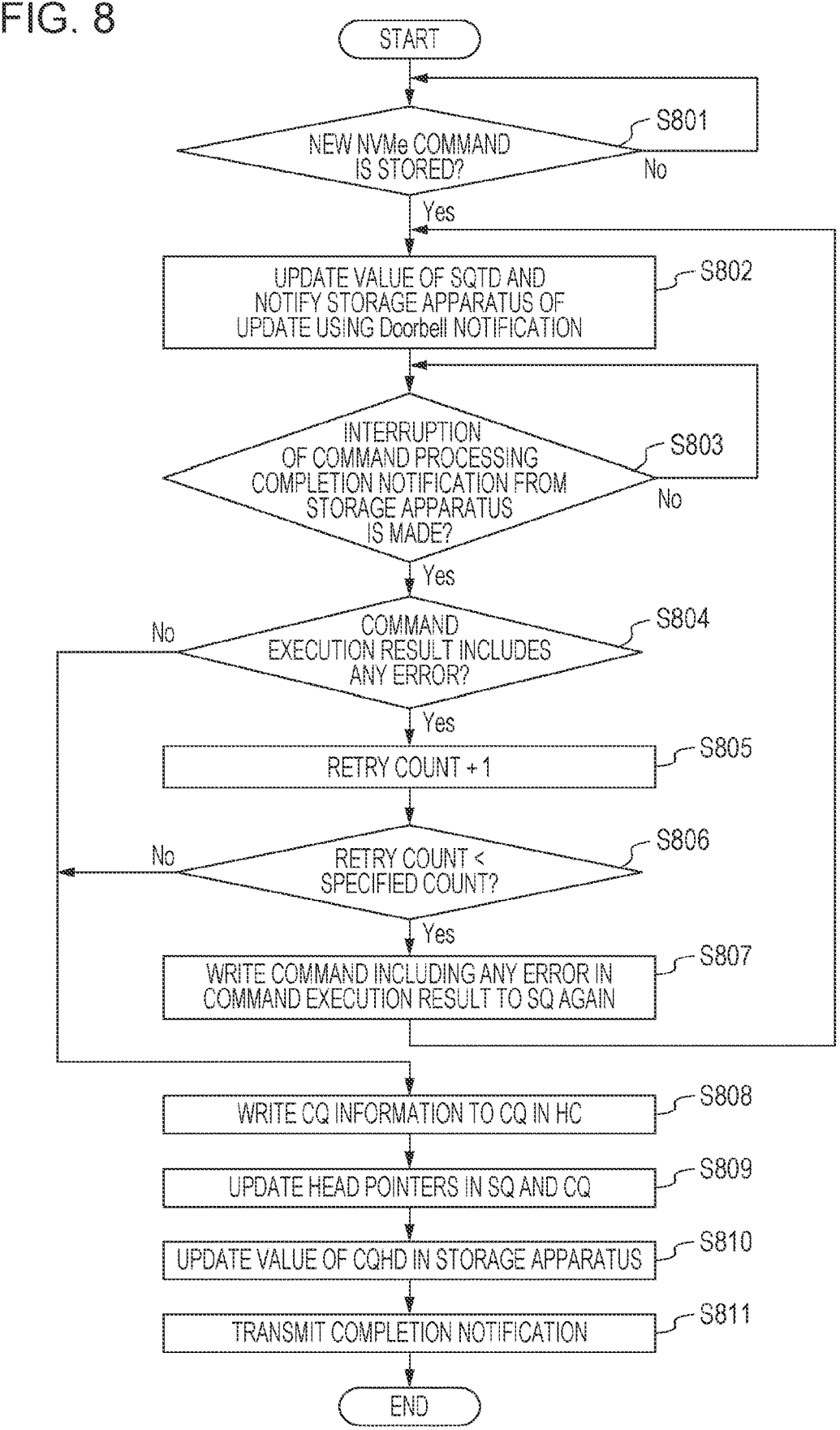
FIG. 8 is a flowchart illustrating a process of notifying the HC of a completion notification from the storage apparatus after the bridge apparatus transmits a notification to the storage apparatus.

The flowchart illustrated in FIG. 8 is performed using a program which is read out from the ROM 304 and is stored in the RAM 305 by the sub-CPU 301 in the bridge apparatus 102.

Referring to FIG. 8, in Step S801, the sub-CPU 301 confirms whether the new NVMe command is stored in the SQ 511 in the bridge apparatus 102. A method of confirming the difference between a Head pointer 517 and the Tail pointer 518 of the SQ 511 or a method of accepting a notification indicating that the process in the flowchart in FIG. 6 is completed may be used to confirm whether the new NVMe command is stored in the SQ 511 in the bridge apparatus 102. If the new NVMe command is stored in the SQ 511 in the bridge apparatus 102 (YES in Step S801), the process goes to Step S802. If the new NVMe command is not stored in the SQ 511 in the bridge apparatus 102 (NO in Step S801), the process remains at Step S801.

In Step S802, the sub-CPU 301 notifies the storage apparatus 103 of the storage of the new NVMe command in the SQ 511 in the bridge apparatus 102. Specifically, the sub-CPU 301 writes information about the position of the Tail pointer 518 of the SQ 511 in the SQTD 405 in the storage apparatus 103 using the Doorbell notification.

The notification of the information about the position of the Tail pointer 518 of the SQ 511 using the Doorbell notification to update the value of the SQTD 405 in the storage apparatus 103 results in the extraction of the NVMe command by the SSD controller 401 in the storage apparatus 103.

Then, the processing corresponding to the content of the extracted command is performed and the command execution result is written to the CQ 512 in the bridge apparatus 102 each time the command processing is terminated. If the processing of all the commands in the storage apparatus 103 is completed, the bridge apparatus 102 is notified of the completion of the processing of all the commands in the storage apparatus 103 through an interruption with the command processing completion notification.

In Step S803, the sub-CPU 301 determines whether the interruption of the command processing completion notification from the storage apparatus 103 is made. If the interruption of the command processing completion notification is made (YES in Step S803), the process goes to Step S804. If the interruption of the command processing completion notification is not made (NO in Step S803), the process remains at Step S803 to wait for completion of the command processing in the storage apparatus 103.

In Step S804, the sub-CPU 301 refers to command processing completion information in the storage apparatus 103 to determine whether the command execution result includes any error. If the command processing completion information stored in the CQ 512 in the bridge apparatus 102 includes any error (YES in Step S804), the process goes Step S805 to perform the retransmission process. If the command processing completion information stored in the CQ 512 in the bridge apparatus 102 includes no error (NO in Step S804), the process goes to Step S808.

In Step S805, the sub-CPU 301 increments a retry count by one. In Step S806, the sub-CPU 301 compares the retry count with a retry count upper limit (threshold value). If the retry count is smaller than the retry count upper limit (YES in Step S806), the process goes to Step S807 for the retransmission process. If the retry count is greater than or equal to the retry count upper limit (NO in Step S806), the process goes to Step S808 without performing the retransmission process. Here, the retry count upper limit is capable of being set by the CPU 201 in the HC 101 at startup of the system. Although the fact that the retry count is greater than or equal to the retry count upper limit is set as a certain condition for the threshold value, the certain condition is not limited to this. For example, the fact that the retry count is greater than the retry count upper limit or counting down of the retry count may be set as the certain condition.

In Step S807, the sub-CPU 301 stores only the command including any error in the command execution result, among the commands stored in the SQ 511, in the SQ 511 again. Then, the process goes back to Step S802.

In Step S808, the sub-CPU 301 stores the command processing completion information in the storage apparatus 103 in the HC 101. The sub-CPU 301 sequentially writes the command processing completion information stored in the CQ 512 in the bridge apparatus 102 to the CQ 502 in the HC 101. At this time, as for the command that is executed multiple times through the retransmission, only the result when the command processing is normally completed is written to the CQ 502 in the HC 101. As for the command including any error if the retry count reaches the retry count upper limit, the final execution result is written to the CQ 502 in the HC 101.

In Step S809, the sub-CPU 301 updates the values of the Head pointer 517 and the Head pointer 519 in the SQ 511 and the CQ 512, respectively, in the bridge apparatus 102 to indicate that the new command is stored.

In Step S810, the sub-CPU 301 stores the updated Head pointer of the CQ 512 in the CQHD 406 in the storage apparatus 103 to make a state in which the next transfer is capable of being started.

In Step S811, the sub-CPU 301 notifies the HC 101 that the command processing for the storage apparatus 103 is completed and all the completion notifications are written to the CQ 502 in the HC 101. The sub-CPU 301 notifies the HC 101 that all the command processing completion information about the completed command processing is written to the CQ 502 by an interruption of the command processing completion notification of the previous command.

With the configuration of the first embodiment, the retransmission process is capable of being realized with no processing at the HC 101 side in the system in which the command group on the HC 101 is connected to the storage apparatus 103 via the bridge apparatus 102. It is possible to minimize the time required for error processing between the HC and the bridge apparatus.

Second Embodiment

In the first embodiment, the method is described, in which the CQ 512 in the bridge apparatus 102 is referred to in the retransmission to write only the command including any error in the command execution result from the SQ 511 to the SQ 511 again.

In a second embodiment, the retransmission process is performed by using a temporary buffer (hereinafter referred to as TB 901) that is separately provided and that has the same area as that of the SQ 511. The difference between the configuration of the first embodiment and the configuration of the second embodiment will be mainly described.

Figure 9:
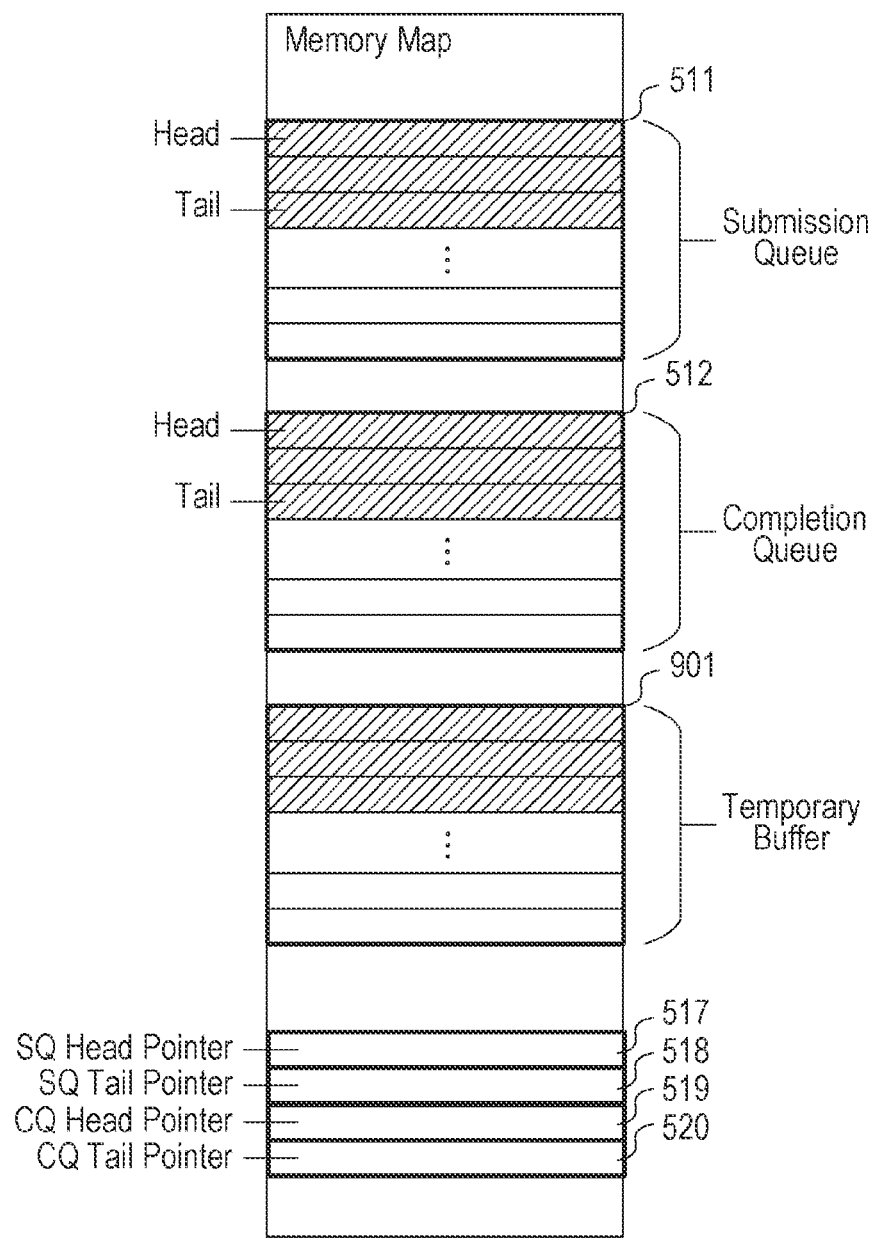
FIG. 9 is a detailed diagram of the memory in the bridge apparatus in a second embodiment.

FIG. 9 is a detailed diagram of the memory in the bridge apparatus 102 in the second embodiment. In the second embodiment, the RAM 305 includes the TB 901. Since the TB 901 is referred to in the retransmission process in the second embodiment, concurrently storing the command group also in the TB 901 in the storage of the command group from the HC 101 in the SQ 511 enables the reference of the command group. A detailed operation will now be described.

Figure 10:
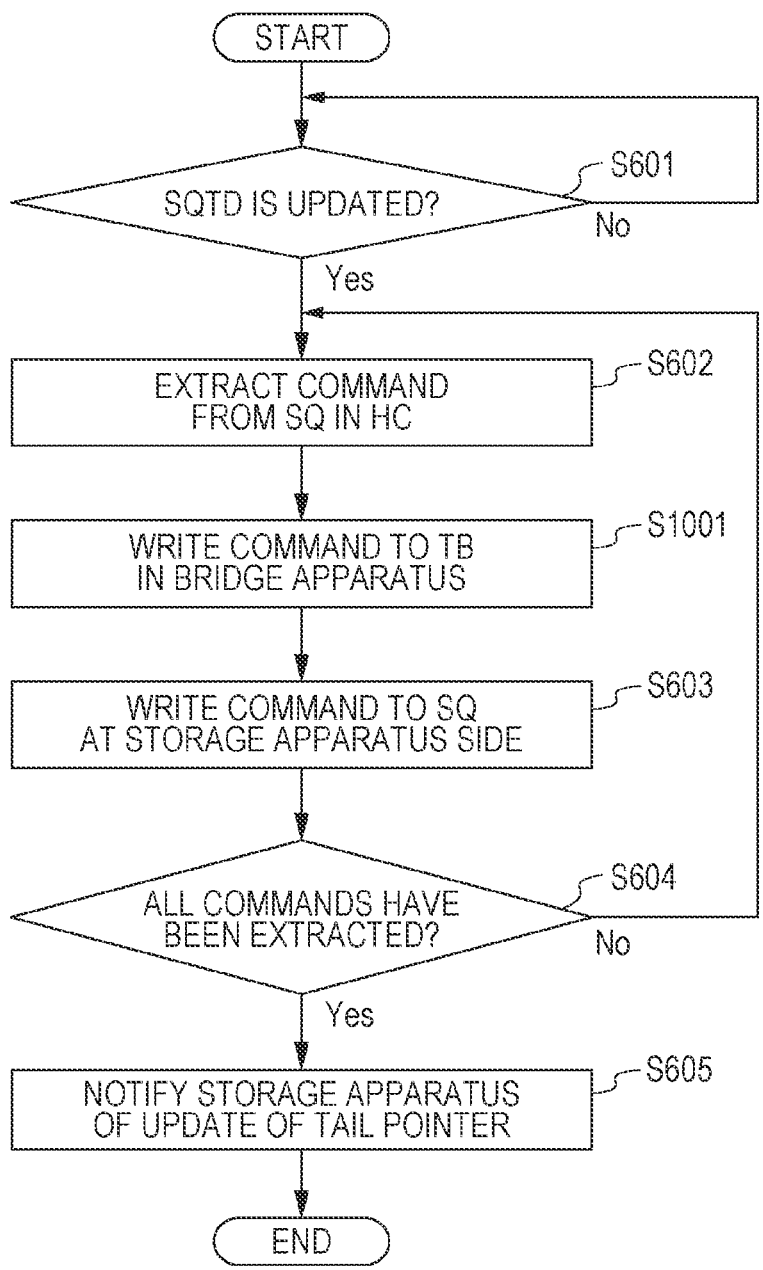
FIG. 10 is a flowchart illustrating a process of extracting the command group from the HC, which is performed by the bridge apparatus, in the second embodiment.

Also in the second embodiment, after the NVMe command is prepared in the HC 101, the bridge apparatus 102 is notified of the NVMe command and extracts the NVMe command. A process in this case is illustrated in a flowchart in FIG. 10. The process in the second embodiment differs from the process in the first embodiment in Step S1001. In Step S602, the sub-CPU 301 extracts the command from the HC 101. Then, the process goes to Step S1001. In Step S1001, the sub-CPU 301 stores the extracted command in the TB 901 in the bridge apparatus 102. Then, the process goes to Step S603. In Step S603, the sub-CPU 301 writes the command to the SQ 511 at the storage apparatus side. With the configuration differing from that of the first embodiment, it is possible to perform the retransmission process without referring to the SQ 511 in the retransmission when any error occurs.

The process of storing the NVMe command in the SQ 511 in the bridge apparatus 102, notifying the storage apparatus 103 of the storage of the NVMe command, and notifying the HC 101 via the bridge apparatus 102 of the command processing completion notification from the storage apparatus 103 is the same as that in the flowchart in FIG. 8. However, when the command including any error in the command execution result is stored in the SQ 511 again in Step S807, the command is stored in the SQ 511 in the first embodiment while the command is stored in the TB 901 in the second embodiment.

Also with the configuration of the second embodiment, the retransmission process is capable of being realized with no processing at the HC 101 side using the above method. It is possible to minimize the time required for the error processing between the HC and the bridge apparatus.

Although the case is described in the first embodiment and the second embodiment in which one storage apparatus is provided, multiple storage apparatuses may be provided in other embodiments. Also in this case, the same effects and advantages as those in the first embodiment and the second embodiment are achieved by adopting the configurations described in the first embodiment and the second embodiment. The SQ 511 in the second embodiment may be provided in each of the multiple storage apparatuses or the multiple storage apparatuses may share the SQ 511. In addition, the SQ 511 and the TB 901 may be provided in each of the multiple storage apparatuses or the multiple storage apparatuses may share the SQ 511 and the TB 901.

Other Embodiments

Although various example embodiments of the present disclosure are described above, the spirit and the scope of the present invention is not limited by the specific description herein.

Various embodiments of the present disclosure are capable of being realized by supplying a program realizing one or more functions of the above embodiments to a system or an apparatus via a network or a storage medium and reading out the program by one or more processors in the computer in the system or the apparatus for execution. In addition, the present disclosure is capable of being realized by a circuit (for example, an application specific integrated circuit (ASIC)) realizing one or more functions.

Various embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2020-180571, filed Oct. 28, 2020, which is hereby incorporated by reference herein in its entirety.

What is claimed is:

1. A control apparatus communicating with a non-volatile storage and a host controller and disposed between the host controller and the storage, the control apparatus comprising:
    a first communication interface (I/F) configured to accept a plurality of requests as a group from the host controller;
    a memory configured to store the plurality of requests received from the host controller;
    a second communication I/F configured to transmit the plurality of requests to the storage upon acceptance of a transmission request for the plurality of requests from the storage and receive, from the storage, a response to each of the plurality of requests; and
    a processor, wherein
    the memory stores the response to each of the plurality of requests, accepted by the first communication I/F;
    the processor identifies a request for which an error response is received, among the plurality of requests, and
    the processor reads a same request as the identified request out of the memory and transmits the read request to the memory via the second communication I/F.

2. The control apparatus according to claim 1, wherein the storage is an Non-volatile Memory Express (NVMe) solid state drive (SSD).

3. The control apparatus according to claim 1, wherein the first communication I/F receives the one group successively from the host computer.

4. The control apparatus according to claim 1,
    wherein, upon acceptance of a normal notification from the storage by the second communication I/F as the response to the same request, the memory stores a normal response as the response to the identified request, and
    the first communication I/F transmits the response to each of the plurality of requests, stored in the memory, to the host controller as a group.

5. The control apparatus according to claim 4,
    wherein, upon acceptance of a normal response from the storage as the response to another request other than the identified request among the plurality of requests by the second communication I/F, the memory stores the normal response as the response to the another request.

6. The control apparatus according to claim 1,
    wherein, if a retry count at which the same request is transmitted to the storage meets a certain condition for a threshold value, a retry operation is stopped.

7. The control apparatus according to claim 6,
    wherein the threshold value for the retry count is set by the host controller.

8. The control apparatus according to claim 1,
wherein the processor transmits a processing completion notification of each of the plurality of requests to the host controller based on storing, by the memory, of the response to each of the plurality of requests.

9. The control apparatus according to claim 1, wherein the storage is a non-volatile semiconductor memory device.

10. The control apparatus according to claim 1,
wherein data stored in the storage includes image data.

11. A method of controlling a control apparatus communicating with a non-volatile storage and a host controller, the control apparatus disposed between the host controller and the storage, the method comprising:
 accepting, by a first communication interface (I/F), a plurality of requests as a group from the host controller, the plurality of requests stored in a memory configured to store the plurality of requests;
 transmitting, by a second communication I/F, the plurality of requests to the storage upon acceptance of a transmission request for the plurality of requests from the storage and receive, from the storage, a response to each of the plurality of requests;
 the memory storing the response to each of the plurality of requests, accepted by the first communication I/F;
 identifying a request for which an error response is received, among the plurality of requests, and
 reading a same request as the identified request out of the memory and transmitting the read request to the memory via the second communication I/F.

* * * * *